(12) United States Patent
Su et al.

(10) Patent No.: US 8,341,587 B2
(45) Date of Patent: Dec. 25, 2012

(54) METHOD OF MANAGING PROCESS FACTORS THAT INFLUENCE ELECTRICAL PROPERTIES OF PRINTED CIRCUIT BOARDS

(75) Inventors: Hsiao-Yun Su, Tu-Cheng (TW);
Ying-Tso Lai, Tu-Cheng (TW);
Cheng-Hsien Lee, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 3 days.

(21) Appl. No.: 13/092,966

(22) Filed: Apr. 24, 2011

(65) Prior Publication Data
US 2012/0066660 A1  Mar. 15, 2012

(30) Foreign Application Priority Data
Sep. 9, 2010 (TW) ............................ 99130514 A

(51) Int. Cl.
*G06F 17/50* (2006.01)
(52) U.S. Cl. ............................................. 716/137
(58) Field of Classification Search .................. 716/137
See application file for complete search history.

*Primary Examiner* — Vuthe Siek
(74) *Attorney, Agent, or Firm* — Altis Law Group, Inc.

(57) ABSTRACT

In a method of managing process factors that influence electrical properties of printed circuit boards (PCBs), n process factors are arranged in an order according to different influence to one kind of electrical property of the PCBs. The different influence is determined by first experiments designed using the Taguchi method. M process factors that have important influence to the electrical property are obtained from the n process factors according to the order to design second experiments. A computing formula for the electrical property is fitted using the m process factors according to simulated results of the second experiments, and a variation range of each of the m process factors is computed according to the computing formula.

18 Claims, 8 Drawing Sheets

| Measuring result of difference impedances (Total: 100) |  |  |  |  |  |  |  |  |  |
|---|---|---|---|---|---|---|---|---|---|
| 98.128 | 100.82 | 95.079 | 98.194 | 94.457 | 95.632 | 95.752 | 98.855 | 94.233 | 95.886 |
| 96.535 | 102.894 | 97.533 | 99.447 | 102.297 | 98.806 | 94.085 | 97.751 | 94.870 | 101.019 |
| 97.53 | 96.471 | 98.413 | 96.588 | 100.384 | 99.616 | 100.361 | 97.361 | 93.108 | 99.592 |
| 100.349 | 101.009 | 98.848 | 99.179 | 102.893 | 100.903 | 99.182 | 99.488 | 99.454 | 100.779 |
| 98.92 | 97.791 | 99.19 | 98.598 | 99.92 | 99.403 | 94.421 | 101.349 | 97.145 | 100.766 |
| 102.81 | 100.168 | 96.841 | 98.088 | 100.31 | 98.483 | 103.101 | 98.06 | 99.148 | 100.473 |
| 96.867 | 95.488 | 99.4 | 93.769 | 97.570 | 100.871 | 95.556 | 100.353 | 98.824 | 104.275 |
| 100.981 | 99.178 | 98.984 | 97.601 | 99.11 | 95.418 | 97.165 | 101.285 | 98.794 | 96.868 |
| 97.544 | 98.12 | 99.815 | 97.247 | 97.115 | 100.412 | 99.612 | 98.128 | 97.778 | 97.985 |
| 99.378 | 98.588 | 93.719 | 98.634 | 101.611 | 99.091 | 94.895 | 103.369 | 96.501 | 97.169 |

| Average value | 98.5211 |
|---|---|
| Standard Deviation | 2.35688 |
| Maximum Value | 104.275 |
| Minimum value | 93.198 |
| Variation range | 11.077 |

FIG. 3

| Variation percent | Process factors (Variation percent : +/- 10%) | | | | | | |
|---|---|---|---|---|---|---|---|
| | W | S | t | SR | Er | D2 | D1 |
| Min (-10%) | 3.6 | 9 | 1.17 | 0.45 | 3.87 | 7.2 | 4.59 |
| Mid (Norm) | 4 | 10 | 1.3 | 0.5 | 4.3 | 8 | 5.1 |
| Max (+10%) | 4.4 | 11 | 1.43 | 0.55 | 4.73 | 8.8 | 5.61 |

FIG. 4

| Experiments | W | S | t | SR | Er | D2 | D1 |
|---|---|---|---|---|---|---|---|
| 01 | Max | Max | Max | Max | Max | Max | Max |
| 02 | Max | Max | Max | Max | Mid | Mid | Mid |
| 03 | Max | Max | Max | Max | Min | Min | Min |
| 04 | Max | Mid | Mid | Mid | Max | Max | Max |
| 05 | Max | Mid | Mid | Mid | Mid | Mid | Mid |
| 06 | Max | Mid | Mid | Mid | Min | Min | Min |
| 07 | Max | Min | Min | Min | Max | Max | Max |
| 08 | Max | Min | Min | Min | Mid | Mid | Mid |
| 09 | Max | Min | Min | Min | Min | Min | Min |
| 10 | Mid | Max | Mid | Min | Max | Mid | Min |
| 11 | Mid | Max | Mid | Min | Mid | Min | Max |
| 12 | Mid | Max | Mid | Min | Min | Max | Mid |
| 13 | Mid | Mid | Min | Max | Max | Mid | Min |
| 14 | Mid | Mid | Min | Max | Mid | Min | Max |
| 15 | Mid | Mid | Min | Max | Min | Max | Mid |
| 16 | Mid | Min | Max | Mid | Max | Mid | Min |
| 17 | Mid | Min | Max | Mid | Mid | Min | Max |
| 18 | Mid | Min | Max | Mid | Min | Max | Mid |
| 19 | Min | Max | Min | Mid | Max | Min | Mid |
| 20 | Min | Max | Min | Mid | Mid | Max | Min |
| 21 | Min | Max | Min | Mid | Min | Mid | Max |
| 22 | Min | Mid | Max | Min | Max | Min | Mid |
| 23 | Min | Mid | Max | Min | Mid | Max | Min |
| 24 | Min | Mid | Max | Min | Min | Mid | Max |
| 25 | Min | Min | Mid | Max | Max | Min | Mid |
| 26 | Min | Min | Mid | Max | Mid | Max | Min |
| 27 | Min | Min | Mid | Max | Min | Mid | Max |

FIG. 5

| Variation range | W | S | T | SR | Er | D2 | D1 |
|---|---|---|---|---|---|---|---|
| Max | 94.43 | 99.44 | 96.74 | 98.72 | 93.6 | 100.05 | 100.76 |
| Mid | 98.26 | 98.4 | 98.33 | 98.43 | 98.03 | 98.67 | 98.51 |
| Min | 102.4 | 97.25 | 100.02 | 97.94 | 103.46 | 96.37 | 95.82 |
| Difference | 7.96 | 2.18 | 3.27 | 0.78 | 9.86 | 3.68 | 4.94 |
| Sequence | 2 | 6 | 5 | 7 | 1 | 4 | 3 |

FIG. 7

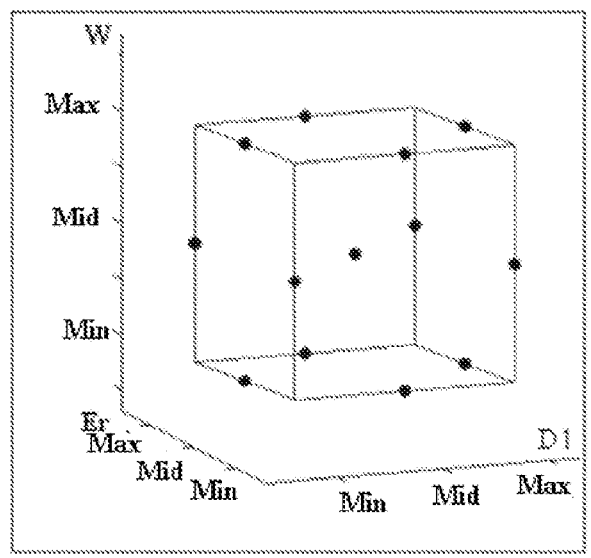

FIG. 8A

| Experiments | W | S | T | SR | Er | D2 | D1 |
|---|---|---|---|---|---|---|---|
| 01 | Min | Mid | Mid | Mid | Min | Mid | Mid |
| 02 | Max | Mid | Mid | Mid | Min | Mid | Mid |
| 03 | Min | Mid | Mid | Mid | Max | Mid | Mid |
| 04 | Max | Mid | Mid | Mid | Max | Mid | Mid |
| 05 | Min | Mid | Mid | Mid | Mid | Mid | Min |
| 06 | Max | Mid | Mid | Mid | Mid | Mid | Min |
| 07 | Min | Mid | Mid | Mid | Mid | Mid | Max |
| 08 | Max | Mid | Mid | Mid | Mid | Mid | Max |
| 09 | Mid | Mid | Mid | Mid | Min | Mid | Min |
| 10 | Mid | Mid | Mid | Mid | Max | Mid | Min |
| 11 | Mid | Mid | Mid | Mid | Min | Mid | Max |
| 12 | Mid | Mid | Mid | Mid | Max | Mid | Max |
| 13 | Mid | Mid | Mid | Mid | Mid | Mid | Mid |
| 14 | Mid | Mid | Mid | Mid | Mid | Mid | Mid |
| 15 | Mid | Mid | Mid | Mid | Mid | Mid | Mid |

FIG. 8B

METHOD OF MANAGING PROCESS FACTORS THAT INFLUENCE ELECTRICAL PROPERTIES OF PRINTED CIRCUIT BOARDS

BACKGROUND

1. Technical Field

Embodiments of the present disclosure generally relate to design of printed circuit boards (PCBs), and more particularly to a method of managing process factors that influence electrical properties of PCBs.

2. Description of Related Art

Quality is an important factor in the manufacture of electronic products. It may be understood that, quality of electronic products may be determined at the design stage. A printed circuit board (PCB) is used to mechanically support and electrically connect electronic components using conductive pathways, tracks or signal traces etched from copper sheets laminated onto a non-conductive substrate. Thus, design of the PCB plays an important role in the quality of an electronic device which houses the PCB.

The design of the PCB usually includes taking into account certain physical parameters to achieve desired electrical properties. The parameters may include physical sizes of the electronic components and signal lines on the PCB, such as line-width, line-spacing, and line-length. The desired properties may include impedance characteristics, and voltage and amplitude variations of electrical signals. The design of PCBs while taking into account the parameters and properties is a complex and crucial process that influences the quality of an electronic device installed with the PCB.

BRIEF DESCRIPTION OF THE DRAWINGS

FIG. 3 is a table comprising exemplary enumerated measurements of one kind of electrical property of N PCBs, and characteristic values obtained from the measurements, according to embodiments of the present disclosure.

FIG. 4 is a table comprising exemplary enumerating n process factors that influence the electrical property of FIG. 2, according to embodiments of the present disclosure.

FIG. 5 is a table illustrating first experiments designed using the Taguchi method, according to embodiments of the present disclosure.

FIG. 7 is an example illustrating an order of the n process factors, arranged according to the graphs of FIG. 6, according to embodiments of the present disclosure.

FIG. 8A and FIG. 8B illustrate second experiments designed using the Response surface methodology, according to embodiments of the present disclosure.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

Figure 1:
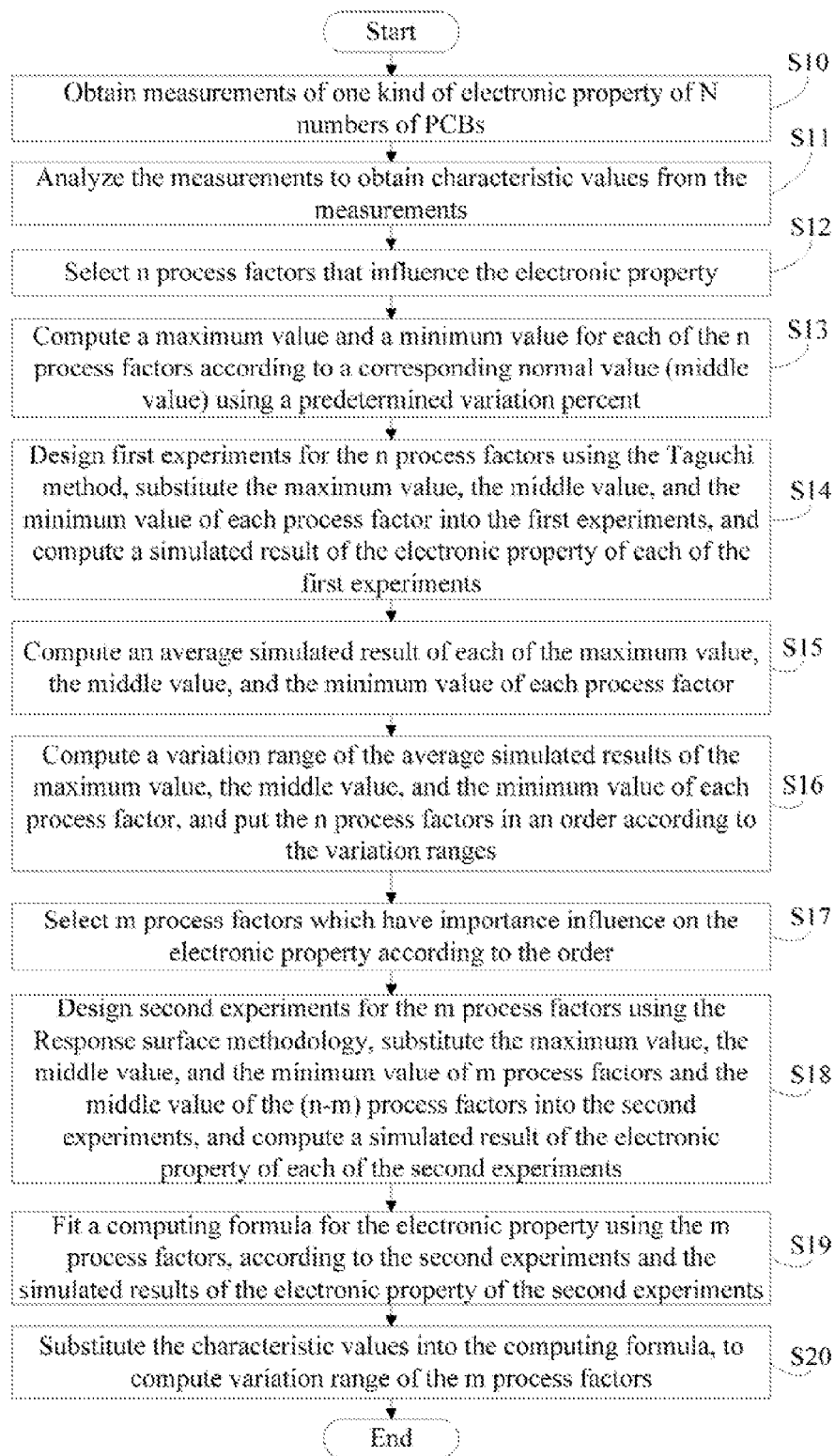
FIG. 1 is a flowchart illustrating a method of managing process factors that influence electrical properties of PCBs, according to embodiments of the present disclosure.
Figure 2:
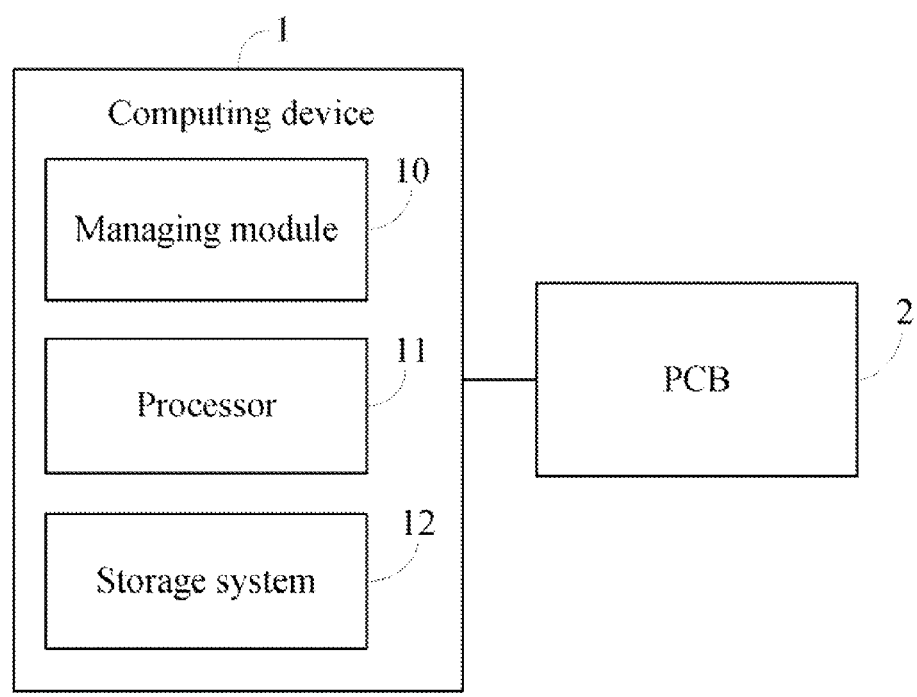
FIG. 2 is a block diagram of one embodiment of a computing device comprising a managing module.

FIG. 1 is a flowchart illustrating a method of managing process factors that influence electrical properties of PCBs 2, according to embodiments of the present disclosure. Depending on the embodiment, additional blocks in the flow of FIG. 1 may be added, others removed, and the ordering of the blocks may be changed. As shown in FIG. 2, the PCBs 2 are electronically connected with a computing device 1. The computer 1 includes a managing module 10, a processor 11, and a storage system 12. It may be understood that one or more specialized or general purpose processors, such as the processor 11, may be used to execute one or more computerized codes of the managing module 10. The one or more computerized codes of the managing module 10 may be stored in the storage system 12. The storage system 12 also stores various data, such as test results, for example.

Types of the process factors that influence electrical properties of each of the PCB 2 may include differential impedance of signal lines, voltage variation, and amplitude variation of electrical signals, for example. In order to describe the below embodiments conveniently, the electrical properties discussed are in regards to the differential impedances as an example. However, it should be understood other electrical properties as mentioned above may be analyzed in substantially the same process.

In block S10, referring to a table given in FIG. 3, the managing module 10 measures differential impedances of N number of PCBs 2, where N is a positive integer. In the present embodiment, N is 100. The differential impedances of the PCBs 2 can include one or more components, traces, signals of the PCB 2 or the PCB 2 itself.

In block S11, the managing module 10 analyzes the measurements to obtain characteristic values from the measurements, like the table illustrated in FIG. 3. In the present embodiment, the characteristic values include an average value of the measurements, a standard deviation of the measurements, a maximum value of the measurements, a minimum value of the measurements, and a variation range of the measurements.

In block S12, referring to a table given in FIG. 4, the managing module 10 selects n process factors that can influence the differential impedance, where n is a positive integer. In the present embodiment, n is 7, and the n process factors includes "W", "S", "t", "SR", "Er", "D2", and "D1". In one example, "W" is a width of differential signal, "S" is a spacing between differential signal wires, "t" is a thickness of copper foil of the differential signal wires, "SR" is a shrunk ratio of each of the PCBs 2, "ER" is a dielectric constant of each of the PCBs 2, "D1" is an upper layer dielectric height, and "D2" is a low layer dielectric height.

In block S13, referring to the example of FIG. 4, the managing module 10 computes a maximum value and a minimum value for each of the n process factors according to a corresponding normal value (middle value) of each process factor using a predetermined variation percentage. It may be understood that, the differential impedance will reach its target value when each process factor is valued at the corresponding normal value. In the present embodiment, the predetermined variation percentage is 10%.

In block S14, referring to an example illustrated in FIG. 5, the managing module 10 designs first experiments for the n process factors using the Taguchi method, substitutes the maximum value, the middle value, and the minimum value of each process factor into the first experiments, and computes a simulated result of the differential impedances of each of the first experiments.

In block S15, the managing module 10 computes an average simulated result of each of the maximum value, the middle value, and the minimum value of each process factor. In an example, referring to FIG. 5, experiments 01~09 use the maximum value of the process factor "W", experiments 10~18 use the middle value of the process factor "W", and the experiments 19~27 use the minimum value of the process factor "W". The managing module 10 totals the simulated results of the experiments 01~09, and divides the total simulated results by 9 as the average simulated result of the maximum value of the process factor "W". Furthermore, the managing module 10 totals the simulated results of the experiments 10~18, and divides the total simulated results by 9 as the average simulated result of the middle value of the process factor "W". The managing module 10 then totals the simulated results of the experiments 19~27, and divides the total simulated results by 9 as the average simulated result of the minimum value of the process factor "W". In another example, still referring to FIG. 5, experiments 01~03, 10~12, and 19~21 use the maximum value of the process factor "S", experiments 04~06, 13~15, and 22~24 use the middle value of the process factor "S", and the experiments 07~19, 16~18, and 25~27 use the minimum value of the process factor "S". The managing module 10 totals the simulated results of the experiments 01~03, 10~12, and 19~21, and divides the total simulated results by 9 as the average simulated result of the maximum value of the process factor "S". Furthermore, the managing module 10 totals the simulated results of the experiments 04~06, 13~15, and 22~24, and divides the total simulated results by 9 as the average simulated result of the middle value of the process factor "S". The managing module 10 then totals the simulated results of the experiments 07~19, 16~18, and 25~27, and divides the total simulated results by 9 as the average simulated result of the minimum value of the process factor "S".

Figure 6:
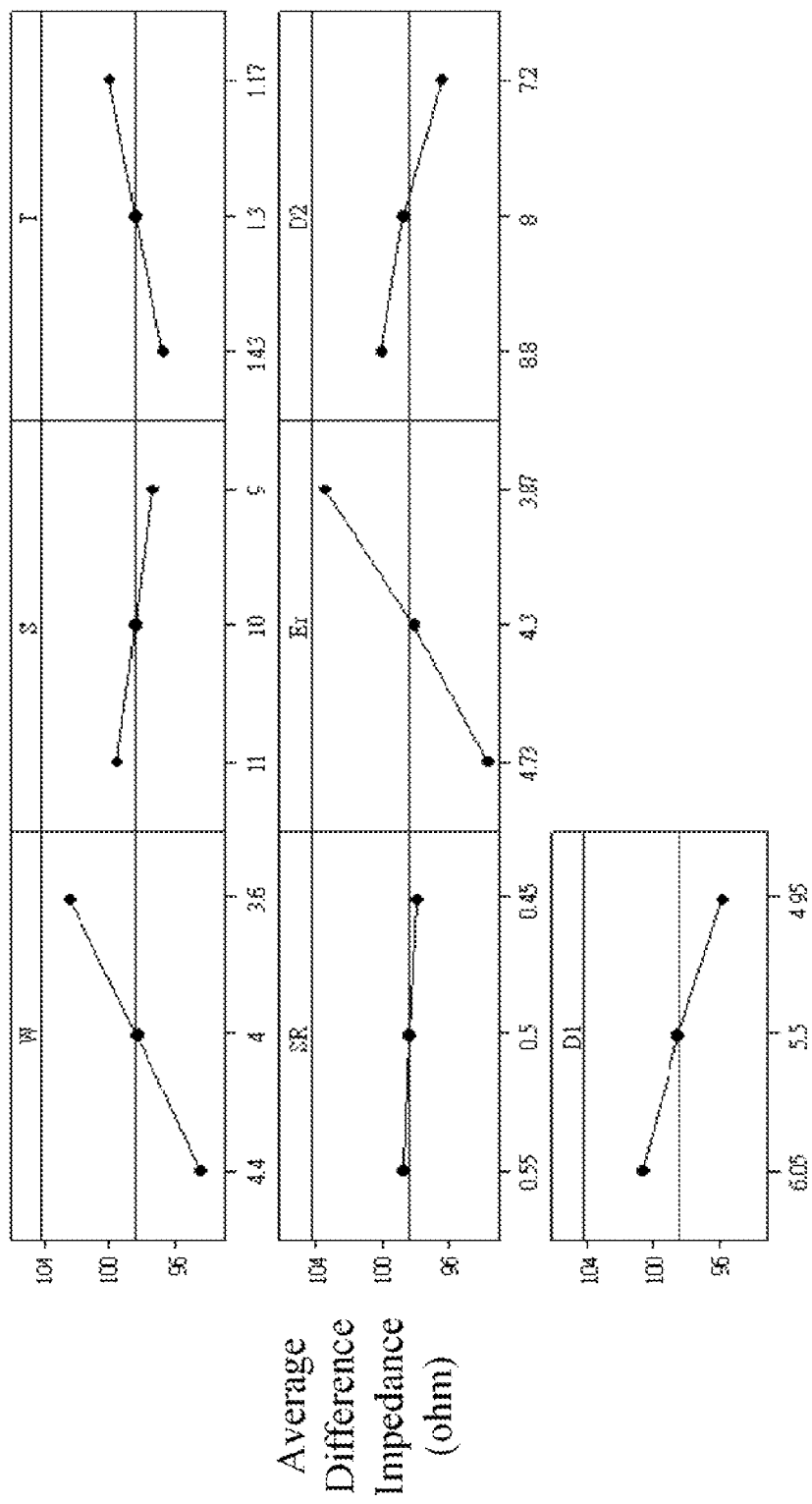
FIG. 6 uses graphs to illustrate different influences of the n process factors to the electrical property of FIG. 3, according to embodiments of the present disclosure.

In block S16, referring to FIG. 6 and FIG. 7, the managing module 10 computes a variation range of the average simulated results of the maximum value, the middle value, and the minimum value of each process factor, and puts the n process factors into an order according to the variation ranges. In an example, referring to FIG. 6 and FIG. 7, the average simulated result of the maximum value 4.4 of the process factor "W" is 94.43, the average simulated result of the middle value 4 of the process factor "W" is 98.26, and the average simulated result of the minimum value 3.6 of the process factor "W" is 102.4 Therefore, the variation range of the average simulated results of the maximum value, the middle value, and the minimum value of process factor "W" is 7.96. It may be understood that, the order shows that different process factors have different influence on the differential impedances of PCBs 2.

In block S17, the managing module 10 determines m process factors which have influence on the differential impedances from the n process factors according to the order, where m is a positive integer. In the present embodiment, m is 3. Referring to the order in FIG. 7, the m process factors are "Er", "W", and "D1".

In block S18, referring to an example given in FIG. 8A and FIG. 8B, the managing module 10 designs second experiments for the m process factors using Response Surface Methodology (RSM), substitutes the maximum value, the middle value, and the minimum value of each of the m process factors, and the middle value of each of the other (n−m) process factors into the second experiments, and computes a simulated result of the differential impedance of each second experiment. Referring to FIG. 8A, using RSM, the managing module 10 firstly constructs a cube whose axis are "Er", "W", and "D1", and then designs the second experiments using the center points of the cube and twelve edges of the cube.

In block S19, the managing module 10 fits a computing formula for the differential impedance using the m process factors, according to the second experiments and the simulated results of the differential impedance of the second experiments. One example of the computing formula is as follows:

$$Zdiff=267.685-14.684*W-17.2189*Er-26.0471*D1+0.323947*W2+0.452506*Er2+1.01153*D12+0.958375*WEr+0.606312*WD1+0.776867*ErD1.$$

In block S20, the managing module 10 substitutes the characteristic values into the computing formula, to compute a variation range of each of the m process factors. As mentioned in block S11, the characteristic values include the average value of the measurements, the standard deviation of the measurements, the maximum value of the measurements, the minimum value of the measurements, and the variation range of the measurements.

It may be understood that, using the variation range of each of the m process factors, an electrical property, such as the differential impedance of each of the PCBs 2 can be well controlled. Thus, the quality of an electronic device using each of the PCBs 2 will be improved.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A method of managing process factors that influence electrical properties of printed circuit boards (PCBs), comprising:

obtaining measurements of at least one type of electrical property of N number of PCBs by a computing device, wherein N is a positive integer;

analyzing the measurements to obtain characteristic values from the measurements by the computing device;

selecting n process factors that influence the electrical property by the computing device, wherein n is a positive integer;

computing a maximum value and a minimum value for each of the n process factors by the computing device according to a corresponding middle value of each process factor using a predetermined variation percent;

designing first experiments for the n process factors using the Taguchi method, substituting the maximum value, the middle value, and the minimum value of each process factor into the first experiments, and computing a simulated result of the electrical property of each of the first experiments by the computing device;

computing an average simulated result of each of the maximum value, the middle value, and the minimum value of each process factor by the computing device;

computing a variation range of the average simulated results of the maximum value, the middle value, and the minimum value of each process factor, and putting the n process factors into an order according to the variation ranges by the computing device;

determining m process factors which have important influence to the electrical property from the n process factors according to the order, wherein m is a positive integer by the computing device;

designing second experiments for the m process factors using the Response surface methodology (RSM), substituting the maximum value, the middle value, and the minimum value of each of the m process factors, and the middle value of each of the other (n−m) process factors into the second experiments, and computing a simulated result of the electrical property of each of the second experiments by the computing device;

fitting a computing formula for the electrical property using the m process factors by the computing device, according to the second experiments and the simulated results of the electrical property of the second experiments; and substituting the characteristic values into the computing formula by the computing device, to compute a variation range of each of the m process factors.

2. The method as described in claim 1, wherein the one type of electrical property is differential impedance of signal lines of the N number of PCBs.

3. The method as described in claim 1, wherein the characteristic values comprise an average value of the measurements, a standard deviation of the measurements, a maximum value of the measurements, a minimum value of the measurements, and a variation range of the measurements.

4. The method as described in claim 1, wherein n is 7.

5. The method as described in claim 1, wherein the predetermined variation percent is 10.

6. The method as described in claim 1, wherein m is 3.

7. The method as described in claim 1, wherein the characteristic values comprise an average value of the measurements, a standard deviation of the measurements, a maximum value of the measurements, a minimum value of the measurements, and a variation range of the measurements.

8. The method as described in claim 1, wherein the n process factors comprise width of differential signal, a spacing between differential signal wires, a thickness of copper foil of the differential signal wires, a shrunk ratio of each of the PCBs, a dielectric constant of each of the PCBs, an upper layer dielectric height, and a lower layer dielectric height.

9. The method as described in claim 1, wherein the m process factors comprise the width of the differential signal, the dielectric constant of each of the PCBs, and the upper layer dielectric height.

10. A non-transitory storage medium having stored thereon instructions that, when executed by a processor, cause the processor to perform a method of managing process factors that influence electrical properties of printed circuit boards (PCBs), wherein the method comprises:

obtaining measurements of at least one type of electrical property of N number of PCBs, wherein N is a positive integer;

analyzing the measurements to obtain characteristic values from the measurements;

selecting n process factors that influence the electrical property, where n is a positive integer;

computing a maximum value and a minimum value for each of the n process factors according to a corresponding middle value of each process factor using a predetermined variation percent;

designing first experiments for the n process factors using the Taguchi method, substituting the maximum value, the middle value, and the minimum value of each process factor into the first experiments, and computing a simulated result of the electrical property of each of the first experiments;

computing an average simulated result of each of the maximum value, the middle value, and the minimum value of each process factor;

computing a variation range of the average simulated results of the maximum value, the middle value, and the minimum value of each process factor, and puts the n process factors into an order according to the variation ranges;

determining m process factors which have important influence to the electrical property from the n process factors according to the order, wherein m is a positive integer;

designing second experiments for the m process factors using the Response surface methodology (RSM), substituting the maximum value, the middle value, and the minimum value of each of the m process factors, and the middle value of each of the other (n−m) process factors into the second experiments, and computing a simulated result of the electrical property of each of the second experiments;

fitting a computing formula for the electrical property using the m process factors, according to the second experiments and the simulated results of the electrical property of the second experiments; and substituting the characteristic values into the computing formula, to compute a variation range of each of the m process factors.

11. The non-transitory storage medium as described in claim 10, wherein the one kind of electrical property is differential impedance of signal lines of the N PCBs.

12. The non-transitory storage medium as described in claim 10, wherein the characteristic values comprises an average value of the measurements, a standard deviation of the measurements, a maximum value of the measurements, a minimum value of the measurements, and a variation range of the measurements.

13. The non-transitory storage medium as described in claim 10, wherein n is 7.

14. The non-transitory storage medium as described in claim 10, wherein the predetermined variation percent is 10.

15. The non-transitory storage medium as described in claim 10, wherein m is 3.

16. The non-transitory storage medium as described in claim 10, wherein the characteristic values comprise an average value of the measurements, a standard deviation of the measurements, a maximum value of the measurements, a minimum value of the measurements, and a variation range of the measurements.

17. The non-transitory storage medium as described in claim 10, wherein the n process factors comprise width of differential signal, a spacing between differential signal wires, a thickness of copper foil of the differential signal wires, a shrunk ratio of each of the PCBs, a dielectric constant of each of the PCBs, an upper layer dielectric height, and a lower layer dielectric height.

18. The non-transitory storage medium as described in claim 10, wherein the m process factors comprise the width of the differential signal, the dielectric constant of each of the PCBs, and the upper layer dielectric height.

* * * * *